United States Patent
Chou et al.

(10) Patent No.: US 9,745,985 B2
(45) Date of Patent: Aug. 29, 2017

(54) BUSHING STRUCTURE AND FAN

(71) Applicant: DELTA ELECTRONICS, INC., Taoyuan Hsien (TW)

(72) Inventors: Yi-Fang Chou, Taoyuan Hsien (TW); Chi-Chang Teng, Taoyuan Hsien (TW); Min-Cheng Tseng, Taoyuan Hsien (TW); Ming-Kai Hsieh, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 487 days.

(21) Appl. No.: 14/314,375

(22) Filed: Jun. 25, 2014

(65) Prior Publication Data

US 2015/0377245 A1  Dec. 31, 2015

(51) Int. Cl.

| F04D 25/06 | (2006.01) |
|---|---|
| F04D 19/00 | (2006.01) |
| F04D 29/64 | (2006.01) |
| F16C 35/02 | (2006.01) |
| F16C 33/08 | (2006.01) |
| F16C 17/02 | (2006.01) |

(52) U.S. Cl.
CPC ......... *F04D 19/002* (2013.01); *F04D 25/062* (2013.01); *F04D 25/0613* (2013.01); *F04D 29/646* (2013.01); *F16C 33/08* (2013.01); *F16C 35/02* (2013.01); *F16C 17/02* (2013.01); *F16C 2220/04* (2013.01); *F16C 2226/30* (2013.01); *F16C 2360/46* (2013.01)

(58) Field of Classification Search
CPC ... F04D 25/062; F04D 25/0613; F04D 29/668
See application file for complete search history.

(56) References Cited

U.S. PATENT DOCUMENTS

| 7,586,228 | B2* | 9/2009 | Best | H02K 1/187 |
|---|---|---|---|---|
| | | | | 310/67 R |
| 8,974,196 | B2* | 3/2015 | Chen | F04D 29/056 |
| | | | | 417/354 |
| 9,267,508 | B2* | 2/2016 | Chang | F04D 25/062 |
| 2008/0218016 | A1* | 9/2008 | Lin | F16C 17/08 |
| | | | | 310/90 |

\* cited by examiner

*Primary Examiner* — Woody Lee, Jr.
*Assistant Examiner* — Sabbir Hasan
(74) *Attorney, Agent, or Firm* — Muncy, Geissler, Olds & Lowe, P.C.

(57) ABSTRACT

A bushing structure cooperating with a shaft is disclosed. The bushing structure includes a cylindrical body and an extension portion. The cylindrical body has a shaft hole and the shaft is disposed in the shaft hole. The extension portion is disposed at one end of the cylindrical body and surrounds the cylindrical body. The cylindrical body and the extension portion are made of an iron-contained material.

17 Claims, 7 Drawing Sheets

BUSHING STRUCTURE AND FAN

BACKGROUND OF THE INVENTION

Field of Invention

The present invention relates to an electromechanical device and, in particular, to a fan.

Related Art

In order to improve the rigidity of the bushing structure of a fan, it is usually to substitute the conventional integrally formed plastic bushing and plastic fan frame with a plastic fan frame in cooperate with a metal bushing made by brass turning process. Herein, the plastic fan frame and the brass metal bushing are bound by injection molding.

Although the design of metal bushing is benefit to improve the rigidity of the entire bushing structure and is capable to provide anti-vibration function in the high-speed fan, it still has some drawbacks. (1) The metal bushing is mostly made of brassiness, so the material cost is high. (2) The metal bushing is made by brass turning process, which has high manufacturing cost and long working term. Besides, the design of the bushing may also affect the number of steps in the brass turning process. In order to well control the cost, the metal bushing generally has simple design and thus no or few flexibility. (3) Moreover, since the brass material is easily deformed, the brass metal bushing may be deformed while being disposed in the fan frame plastic mold during the injection molding process. This deformation will cause undesired tolerance in the following assembling procedure of the bushing structure.

Therefore, it is an important subject to provide a bushing structure with lower cost and reinforced rigidity and a fan configured with the bushing structure.

SUMMARY OF THE INVENTION

In view of the foregoing subject, an objective of the present invention is to provide a bushing structure with lower cost and reinforced rigidity and a fan configured with the bushing structure.

To achieve the above objective, the present invention discloses a bushing structure cooperating with a shaft. The bushing structure includes a cylindrical body and an extension portion. The cylindrical body has a shaft hole and the shaft is disposed in the shaft hole. The extension portion is disposed at one end of the cylindrical body and surrounds the cylindrical body. The cylindrical body and the extension portion are made of an iron-contained material.

To achieve the above objective, the present invention also discloses a fan including a fan frame, a bushing structure, a stator and a rotor.

The rotor is disposed corresponding to the stator and includes a shaft and an impeller. The bushing structure includes a cylindrical body and an extension portion. The cylindrical body has a shaft hole and the shaft is disposed in the shaft hole. The extension portion is disposed at one end of the cylindrical body and surrounds the cylindrical body. The cylindrical body is made of an iron-contained material. The bushing structure is disposed on the fan frame, and the fan frame is connected to the bushing structure by injection molding.

In one embodiment of the invention, the bushing structure further includes at least one first positioning member disposed on an inner wall of the cylindrical body.

In one embodiment, the first positioning member is a protrusion or a recess.

In one embodiment, the bushing structure further includes at least one fitting member cooperating with the first positioning member. Herein, the fitting member is made of a plastic material.

In one embodiment, the extension portion further includes at least one second positioning member, which is a through hole, a recess, a protrusion or a concave-convex structure.

In one embodiment, the extension portion further includes a circuit board accommodating slot.

In one embodiment, the extension portion and the cylindrical body are integrated as one piece.

As mentioned above, the bushing structure of the present invention is made of an iron-containing material and is configured with an extension portion for enhancing the bonding force with the plastic fan frame. Accordingly, this invention can provide a bushing structure with lower cost and reinforced rigidity, and a fan applied with the novel bushing structure.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The bushing structure disclosed in the invention can be applied to the centrifugal fan or axial-flow fan depending on different requirements. Although the following example only illustrates an axial-flow fan, those skilled persons should understand that this novel designed bushing structure can also be applied to a centrifugal fan. In brief, the applicable fan of the invention is not limited to the following embodiment.

Figure 1:
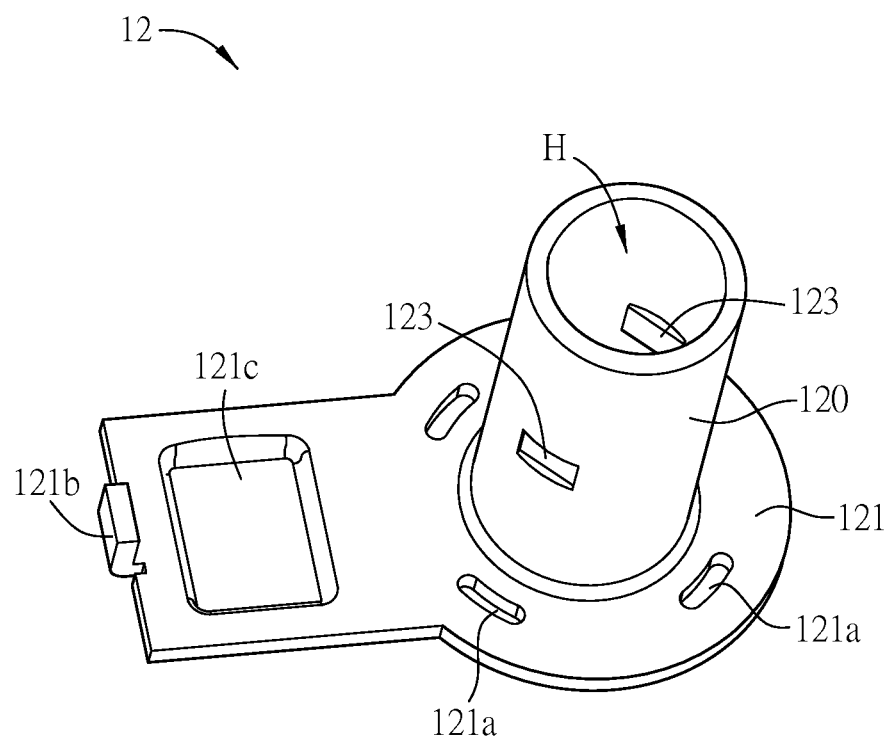
FIG. 1 is a perspective diagram showing a bushing structure according to an embodiment of the invention.

FIG. 1 is a perspective diagram showing a bushing structure 12 according to an embodiment of the invention.

In this embodiment, the bushing structure 12 includes a cylindrical body 120 and an extension portion 121. The cylindrical body 120 has a shaft hole H. The extension portion 121 is disposed at one end of the cylindrical body 120 and surrounds the cylindrical body 120. In more detailed, the extending direction of the extension portion 121 is substantially perpendicular to the axial direction of the cylindrical body 120, but this invention is not limited thereto. The cylindrical body 120 and the extension portion 121 can be integrated as a single piece. In other words, the cylindrical body 120 and the extension portion 121 can be made by a single process.

The edge of the extension portion 121 can be circular, polygonal or irregular. In the following assembling procedure for binding the fan frame and the bushing structure 12, the extension portion 121 is partially received in the fan frame so as to achieve the goal of fixing the bushing structure 12 on the fan frame. Accordingly, the bushing structure 12 of the present embodiment does not need the knurl structure of cylindrical body of the conventional bushing structure for fixing with the fan frame.

Besides, since the rigidity of the extension portion 121 is larger than that of the fan frame, which is made of plastic material, the extension portion 121 can be designed into any desired specific shape, thereby reinforcing the specific parts of the fan frame.

In addition, the cylindrical body 120 and the extension portion 121 are made of an iron-containing material such as a steel plate or an iron plate (SECC/SECD), which is cheaper than the brass material and has higher rigidity than the brass material.

To be noted, the bushing structure 12 is formed by processing (pressing and deep drawing process) an iron-containing plate. Since the iron-containing plate has better extensibility, the drawbacks of the turning process can be prevented. For example, the pressing and deep drawing process has lower cost and shorter working time than the turning process. Besides, the turning process can fabricate only one bushing structure in each process, but the pressing process can manufacture multiple bushing structures in a single process. Compared with the turning process, the processing process can remain a smaller amount of waste materials, so it is much environmental friendly and can also minimize the recycle issue. In this embodiment, the bushing structure 12 can be further processed to increase the accuracy thereof or to form a protective layer by electroplating (antirust).

Moreover, an additional benefit of using the plate made of an iron-containing material is that the iron-containing material is easier prepared than the brass material and is mostly available from the suppliers. Besides, the bushing structure can be cut into any desired length suitable for the following processes depending on the design.

As shown in FIG. 1, the bushing structure 12 further includes at least a first positioning member 123 disposed on the inner wall of the cylindrical body 120. The first positioning member 123 is configured for fixing a fitting member (see FIG. 4) in the shaft hole H, thereby positioning and supporting the shaft. The detailed description of the configuration and function of the fitting member will be discussed later. In this embodiment, the first positioning member 123 is used for positioning the fitting member only instead of the shaft, so that the accuracy and positions thereof are not so limited.

In practice, the first positioning member 123 is a protrusion extending toward the axis. In this embodiment, two symmetrical first positioning members 123 are configured and formed by side punch. To be noted, the number of the first positioning member 123 is not limited to the above embodiment, and they can also be asymmetrically arranged. In other aspects, the first positioning member can be a recess instead of a protrusion of this embodiment.

In practice, the extension portion 121 may further include at least a second positioning member. In this embodiment, two second positioning members 121*a* and 121*b*, including a through hole and a protrusion, are configured. If the second positioning member 121*a* is a through hole, the binding force between the second positioning member 121*a* and the fan frame can be reinforced. If the second positioning member 121*b* is a protrusion, it can cooperate with other components of the fan for positioning. Except for the through hole and protrusion, the second positioning member can have any different design such as a recess or a concave-convex structure.

In the general design, the fan frame usually has an opening corresponding to the circuit board, thereby preventing the interference between the circuit board and the fan frame. However, the configuration of the opening will make the structure of the fan frame relatively be weaker. In this embodiment, the extension portion 121 further has a circuit board accommodating slot 121*c* configured corresponding to the circuit board (not shown). Accordingly, this configuration can prevent the interference between the circuit board and the fan frame, and keep or strengthen the structure intensity.

Figure 2:
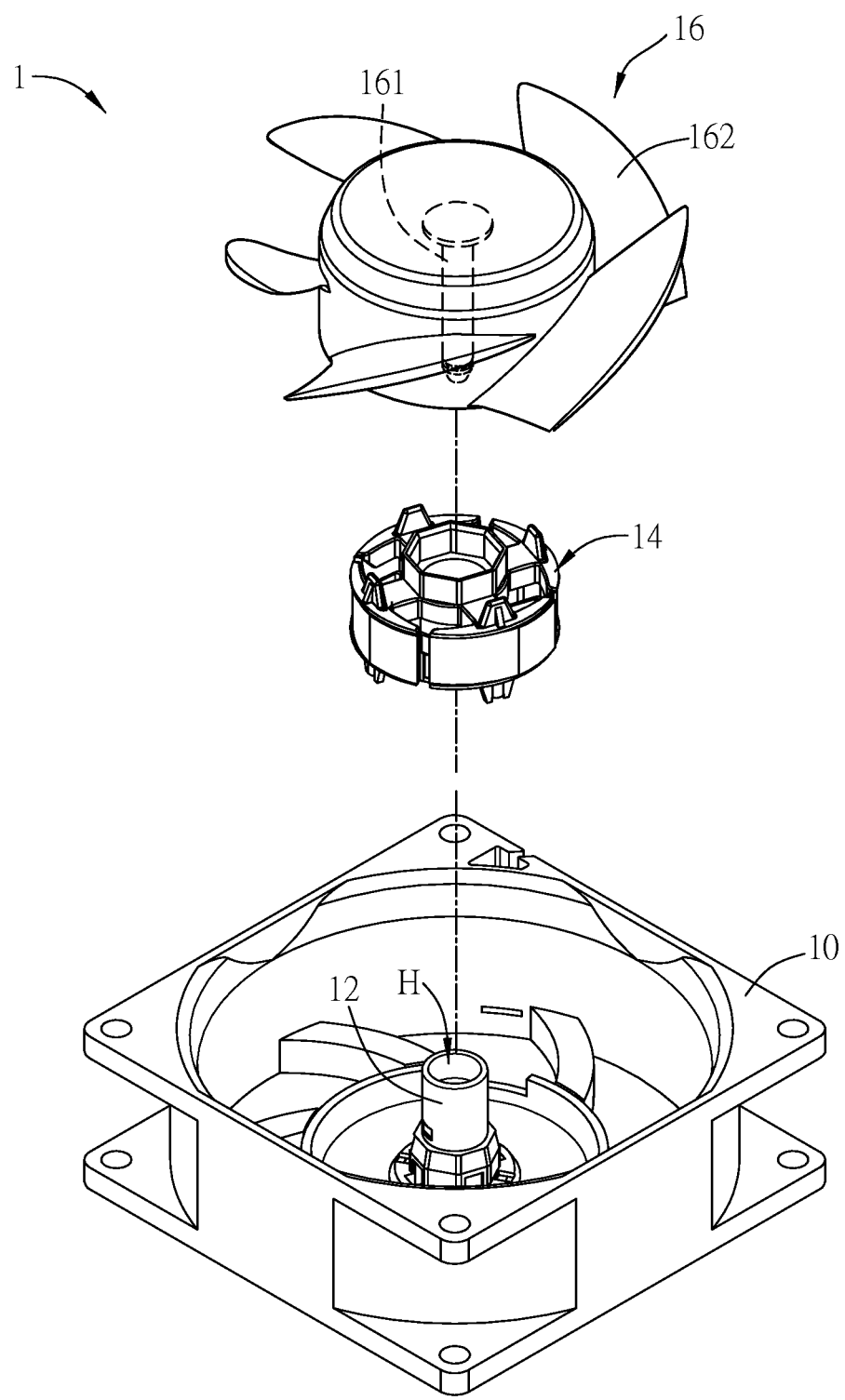
FIG. 2 is an exploded view of a fan according to the embodiment of the invention.
Figure 3:
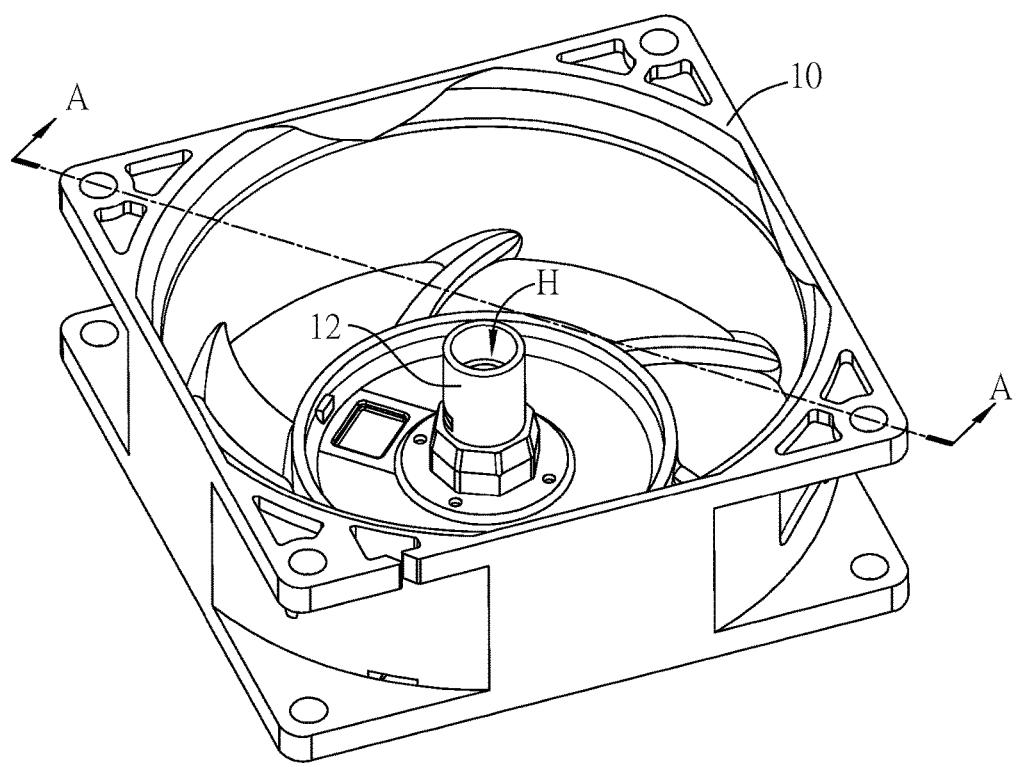
FIG. 3 is a partial enlarged view of FIG. 2.
Figure 4:
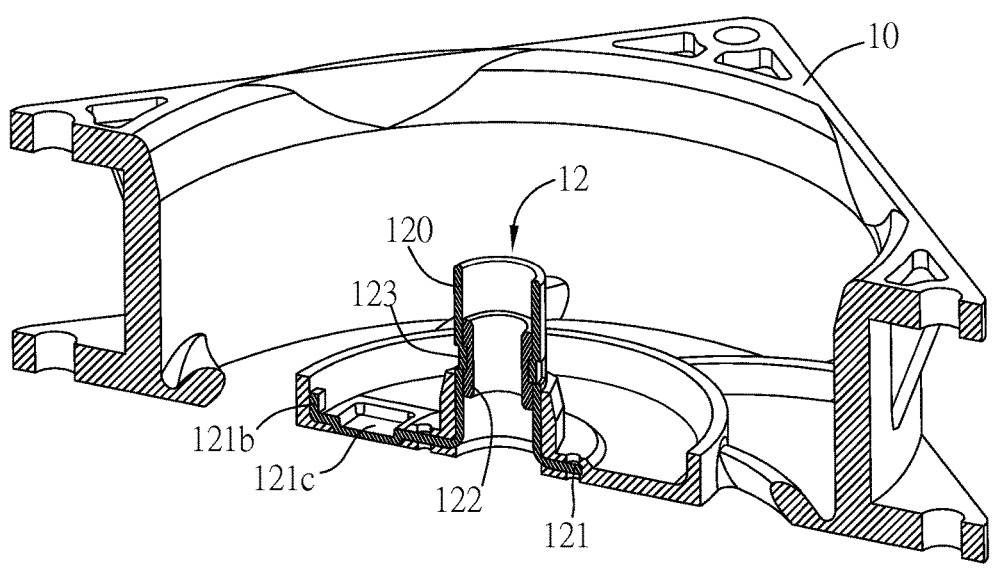
FIG. 4 is a sectional view of the fan of FIG. 3 along the line AA.

FIG. 2 is an exploded view of a fan according to the embodiment of the invention, FIG. 3 is a partial enlarged view of FIG. 2, and FIG. 4 is a sectional view of the fan of FIG. 3 along the line AA.

Referring to FIGS. 2 to 4, the fan 1 of the embodiment at least includes a fan frame 10, a bushing structure 12, a stator 14 and a rotor 16. The bushing structure 12 can be the previously mentioned bushing structure in FIG. 1. Of course, the bushing structure 12 can be any structure illustrated in the specification and is not limited to the above mentioned bushing structure of FIG. 1.

The bushing structure 12 includes a cylindrical body 120 and an extension portion 121. The cylindrical body 120 has a shaft hole H and is made of an iron-containing material. The extension portion 121 is disposed at one end of the cylindrical body 120 and surrounds the cylindrical body 120.

Referring to FIG. 4, the bushing structure 12 further includes at least one fitting member 122 cooperating with the first positioning member 123. In practice, the fitting member 122 can form a gap structure (similar to the conventional bushing structure) on the inner wall of the bushing structure 12 for clipping the shaft 161 inserted into the shaft hole H. Herein, the fitting member 122 is made of a plastic material. Besides, the fitting member 122 and the fan frame 10 are separated and individual components, and they can be fabricated by different processes.

To be noted, the fan frame and the fitting member can be formed by plastic injection molding; otherwise, the fitting member 122 can be formed on the first positioning member 123 by individual glue dispensing. In this case, the first positioning member 123 is configured to marking the position of the fitting member 122. In practice, the first positioning member 123 is not indispensable. In another embodiment, a mold with positioning function is used to adjust the position of the fitting member 122 attached on the inner wall of the bushing structure 12. This configuration can also provide the desired fitting member in cooperating with the bushing structure.

In practice, the height and position of the fitting member 122 can be adjusted corresponding to different machines, and they are not limited to this embodiment.

The detailed descriptions of the configuration of the bushing structure 12 and the cooperation of the cylindrical body 120 and the extension portion 121 are not repeated here.

The bushing structure 12 is disposed on the fan frame 10, and they are connected by injection molding. The rotor 16 is disposed corresponding to the stator 14. The rotor 16 includes a shaft 161 and an impeller 162. The shaft 161 is disposed in the shaft hole H of the bushing structure 12.

The bushing structure 12 is made of an iron-containing material and is configured with an extension portion for enhancing the bonding force with the plastic fan frame. Accordingly, a fan with lower cost and reinforced rigidity can be provided.

FIGS. 5A to 5E are schematic diagrams showing several aspects of different bushing structures of the invention.

Figure 5A:
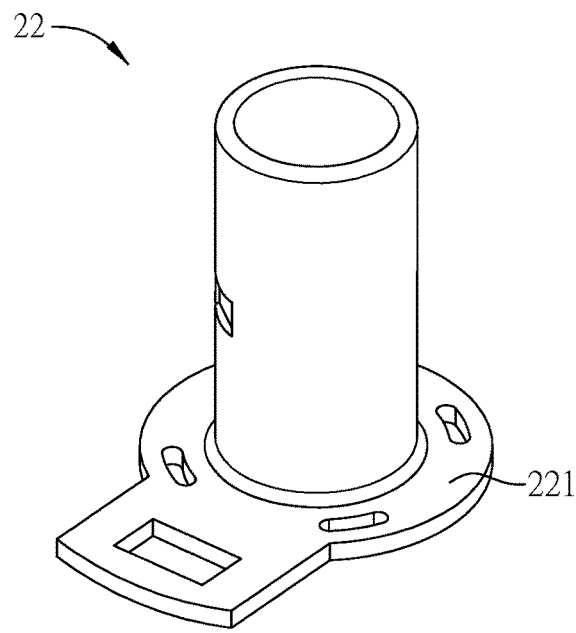
FIGS. 5A to 5E are schematic diagrams showing several aspects of different bushing structures of the invention.
Figure 5B:
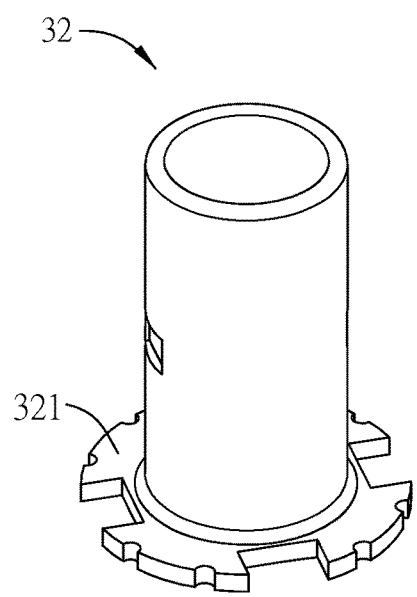
Figure 5C:
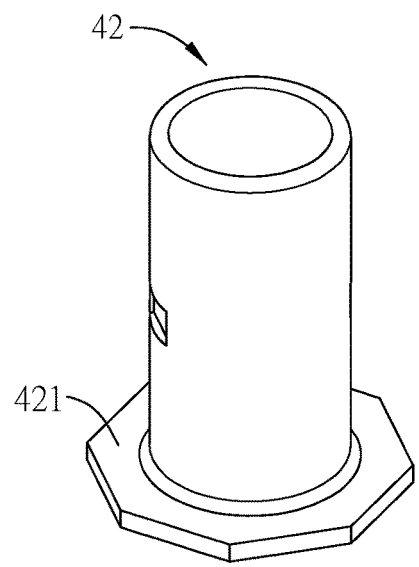
Figure 5D:
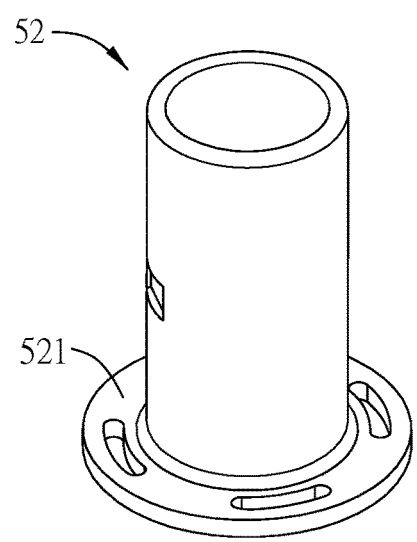
Figure 5E:
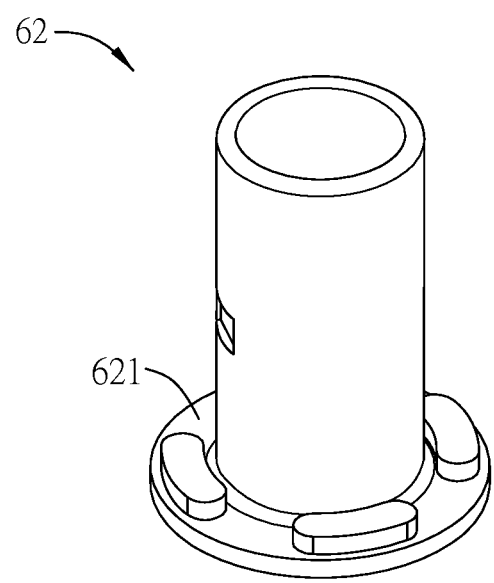

Different from the previous aspect, the edge of the extension portion 221 of the bushing structure 22 as shown in FIG. 5A has an irregular shape, and the extension portion 221 has a rectangular extension section. In this case, the extension portion 221 and the extension section have a plurality of through holes. In FIG. 5B, the edge of the extension portion 321 of the bushing structure 32 has a saw-teeth shape. In FIG. 5C, the edge of the extension portion 421 of the bushing structure 42 has a polygonal shape. In FIG. 5D, the edge of the extension portion 521 of the bushing structure 52 has a circular shape, and it also has a plurality of through holes. In FIG. 5E, the edge of the extension portion 621 of the bushing structure 62 has a circular shape, and a plurality of protrusion structures are disposed thereon.

Through the extension portions of different shapes, it is possible to prevent the rotation of the cylindrical body during the injection molding process, to assist the positioning of axis direction, and to reinforce the binding force between the bushing structure and the fan frame. In addition, the configuration of the extension portion can also strengthen the fan frame, which may have weaker structure design for avoiding interference with other components of the fan. Moreover, the extension portion can be used for positioning other components and the bushing structure after assembling process.

These aspects can achieve similar effect as the above mentioned embodiment. Since the configuration and arrangement of the components have been described in the above embodiment, the detailed descriptions thereof will be omitted.

In summary, the bushing structure of the present invention is made of an iron-containing material and is configured with an extension portion for enhancing the bonding force with the plastic fan frame. Accordingly, this invention can provide a bushing structure with lower cost and reinforced rigidity, and a fan applied with the novel bushing structure.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A bushing structure cooperating with a shaft, wherein the bushing structure is configured to be connected with a fan frame, the bushing structure comprising:
    a cylindrical body having a shaft hole, wherein the shaft is disposed in the shaft hole; and
    an extension portion disposed at one end of the cylindrical body and surrounding the cylindrical body, wherein the extension portion includes a circuit board accommodating slot;
    wherein the cylindrical body and the extension portion are made of an iron-containing material,
    wherein the extension portion is partially embedded in the fan frame so as to fix the bushing structure on the fan frame.

2. The bushing structure of claim 1, further comprising at least a first positioning member disposed on an inner wall of the cylindrical body.

3. The bushing structure of claim 2, wherein the first positioning member is a protrusion or a recess.

4. The bushing structure of claim 2, further comprising at least a fitting member cooperating with the first positioning member.

5. The bushing structure of claim 4, wherein the fitting member is made of a plastic material.

6. The bushing structure of claim 1, wherein the extension portion further comprises at least a second positioning member.

7. The bushing structure of claim 6, wherein the second positioning member is a through hole, a recess, a protrusion or a concave-convex structure.

8. The bushing structure of claim 1, wherein the extension portion and the cylindrical body are integrated as one piece.

9. A fan, comprising:
    a bushing structure comprising a cylindrical body and an extension portion, wherein the cylindrical body is made of an iron-containing material and has a shaft hole, and the extension portion is disposed at one end of the cylindrical body and surrounds the cylindrical body, wherein the extension portion includes a circuit board accommodating slot;
    a stator;
    a rotor corresponding to the stator, wherein the rotor comprises a shaft and an impeller, and the shaft is disposed in the shaft hole of the bushing structure; and
    a fan frame, wherein the extension portion is partially embedded in the fan frame so as to fix the bushing structure on the fan frame, and the fan frame is connected to the bushing structure by injection molding.

10. The fan of claim 9, wherein the bushing structure further comprises at least a first positioning member disposed on an inner wall of the cylindrical body.

11. The fan of claim 9, wherein the first positioning member is a protrusion or a recess.

12. The fan of claim 10, wherein the bushing structure further comprises at least a fitting member cooperating with the first positioning member.

13. The fan of claim 12, wherein the fitting member is made of a plastic material.

14. The fan of claim 12, wherein the fitting member is not connected with the fan frame.

15. The fan of claim 9, wherein the extension portion further comprises at least a second positioning member.

16. The fan of claim 15, wherein the second positioning member is a through hole, a recess, a protrusion or a concave-convex structure.

17. The fan of claim 9, wherein the extension portion and the cylindrical body are integrated as one piece.

* * * * *